US012800225B2

(12) United States Patent
Peterson et al.

(10) Patent No.: US 12,800,225 B2
(45) Date of Patent: Nov. 17, 2026

(54) SYSTEM AND METHOD FOR TREATING ASSOCIATED GAS

(71) Applicant: GTUIT, LLC, Billings, MT (US)

(72) Inventors: Mark Peterson, Helena, MT (US); James L. Haider, Helena, MT (US); Brian R. Cebull, Billings, MT (US); Austin VanDelinder, Billings, MT (US); Tim Boelter, Billings, MT (US); Stephen Doll, Polson, MT (US); Wade Wolf, Billings, MO (US); Joey Hope, Billings, MT (US)

( * ) Notice: Subject to any disclaimer, the term of this patent is extended or adjusted under 35 U.S.C. 154(b) by 248 days.

(21) Appl. No.: 18/731,281

(22) Filed: Jun. 1, 2024

(65) Prior Publication Data

US 2024/0384929 A1 Nov. 21, 2024

Related U.S. Application Data

(62) Division of application No. 17/402,554, filed on Aug. 15, 2021, now Pat. No. 12,025,373.

(Continued)

(51) Int. Cl.

*F25J 3/06* (2006.01)
*B01D 53/00* (2006.01)

(Continued)

(52) U.S. Cl.

CPC ............ *F25J 3/061* (2013.01); *B01D 53/002* (2013.01); *C10L 3/10* (2013.01); *C10L 3/12* (2013.01);

(Continued)

(58) Field of Classification Search

CPC .......... F25J 3/061; F25J 3/0635; F25J 3/0695; F25J 2220/68; F25J 1/0204; F25J 1/0275;

(Continued)

(56) References Cited

U.S. PATENT DOCUMENTS 4,022,597 A 5/1977 Bacon
4,462,813 A * 7/1984 May ...................... F25J 3/0645 62/912

(Continued)

FOREIGN PATENT DOCUMENTS

JP 2939814 B2 * 8/1999 ............ F25J 3/0233
KR 102034477 B1 10/2019

(Continued)

*Primary Examiner* — John F Pettitt, III
(74) *Attorney, Agent, or Firm* — Antoinette M. Tease

(57) ABSTRACT

A system and method for treating associated gas in which a stream of raw gas is passed through safety valving, an inlet pressure control mechanism, and an inlet scrubber. Pressure/temperature data is transmitted to a control system via pressure and temperature transducers. The raw gas is sent to a gas compressor to generate pressurized gas, which is sent to an aerial cooler and a chiller heat exchanger, in which a chilling media contacts the pressurized gas. The chilled pressurized gas is sent to a vapor liquid separator to generate processed gas, which is routed through either a system backpressure valve or a pressure reducing recycle valve that directs the processed gas to the inlet scrubber. The processed gas that has passed through the system backpressure valve is delivered as fuel or routed through a backpressure regulating recycle valve that directs the processed gas to a system inlet pressure reducing valve.

4 Claims, 7 Drawing Sheets

Related U.S. Application Data

(60) Provisional application No. 63/066,277, filed on Aug. 16, 2020.

(51) Int. Cl.
*C10L 3/10* (2006.01)
*C10L 3/12* (2006.01)

(52) U.S. Cl.
CPC .......... *F25J 3/0635* (2013.01); *F25J 3/0695* (2013.01); *F25J 2205/04* (2013.01); *F25J 2220/64* (2013.01); *F25J 2220/68* (2013.01); *F25J 2230/60* (2013.01); *F25J 2270/90* (2013.01)

(58) Field of Classification Search
CPC .. F25J 2290/70; F25J 2245/02; F25J 2230/30; B01D 53/002; C10L 3/10; C10L 3/12
See application file for complete search history.

(56) References Cited

U.S. PATENT DOCUMENTS

| | | | | |
|---|---|---|---|---|
| 4,609,390 | A | 9/1986 | Wilson | |
| 6,105,390 | A | 8/2000 | Bingham et al. | |
| 7,219,512 | B1 | 5/2007 | Wilding et al. | |
| 7,600,396 | B2 | 10/2009 | Mak | |
| 8,020,406 | B2 | 9/2011 | Vandor et al. | |
| 8,505,333 | B2 | 8/2013 | Evans et al. | |
| 9,829,244 | B2 | 11/2017 | Mak | |
| 9,863,696 | B2 * | 1/2018 | Chong | F25J 1/0052 |
| 9,945,608 | B2 | 4/2018 | Ploeger et al. | |
| 10,655,911 | B2 | 5/2020 | Turner et al. | |
| 2007/0130991 | A1 * | 6/2007 | Shipchandler | F25J 3/061 62/620 |
| 2014/0366577 | A1 | 12/2014 | Zubrin et al. | |
| 2015/0007981 | A1 * | 1/2015 | Shomody | E21B 41/005 166/245 |
| 2017/0335205 | A1 * | 11/2017 | Meyer | C10G 7/00 |
| 2018/0016977 | A1 * | 1/2018 | Nagavarapu | F25J 3/0645 |
| 2019/0204007 | A1 * | 7/2019 | Ducote, Jr. | F25J 1/0219 |
| 2019/0225891 | A1 * | 7/2019 | Suppiah | C10L 3/12 |
| 2020/0208910 | A1 * | 7/2020 | Park | F25J 1/004 |
| 2020/0339889 | A1 * | 10/2020 | Mechler | C10L 3/12 |
| 2021/0088273 | A1 * | 3/2021 | Harman, Jr. | F25J 1/0035 |
| 2022/0049896 | A1 * | 2/2022 | Peterson | F25J 3/0695 |
| 2022/0196322 | A1 * | 6/2022 | Cebull | C10L 3/12 |
| 2022/0219111 | A1 * | 7/2022 | Cebull | B01D 46/003 |
| 2023/0175772 | A1 * | 6/2023 | Peterson | F25J 3/0695 62/618 |

FOREIGN PATENT DOCUMENTS

| | | | | |
|---|---|---|---|---|
| WO | WO-2004065869 A1 * | 8/2004 | | F25J 1/02 |
| WO | WO-2025191184 A1 * | 9/2025 | | F25J 1/0275 |

* cited by examiner

SYSTEM AND METHOD FOR TREATING ASSOCIATED GAS

CROSS-REFERENCE TO RELATED APPLICATION

Pursuant to 35 U.S.C. § 119(e), this application claims the benefit of U.S. Patent Application No. 63/066,277, filed on Aug. 16, 2020.

BACKGROUND OF THE INVENTION

1. Field of the Invention

The present invention relates generally to the field of oil and gas production, and more particularly, to a system and method for the treatment of associated gas, also known as rich gas, for use in reciprocating engines and turbines.

2. Description of the Related Art

The present invention differs from the prior art in a number of significant ways. Although the inventions discussed below generally involve the treatment of natural gas, they are not directed toward solving the same problem as the present invention, and they do not involve the same component parts or steps as the present invention. They are set forth here for general background purposes only.

For example, U.S. Pat. No. 4,022,597 (Bacon, 1977) describes a system in which ethane and other hydrocarbons are separated as a liquid from natural gas to leave a gas consisting principally of methane for delivery to a pipeline. The natural gas is passed in countercurrent heat exchange with the liquid product and with the pipeline gas to cool the natural gas to a temperature at which a major part of the ethane is condensed. Bacon uses a fractionation tower and re-vaporization of produced liquids to enhance separation of product streams. The present invention does not use a fractionation tower or re-vaporization of liquids to produce cooling but instead uses a chiller system.

U.S. Pat. No. 4,609,390 (Wilson, 1986) discloses a process and apparatus for separating a hydrocarbon feed gas into residue gas and a less volatile product fraction utilizing phase separation resulting from cooling. This patent describes a system in which no external refrigeration is required; the present invention, on the other hand, uses refrigeration in a chiller configuration.

U.S. Pat. No. 6,105,390 (Bingham et al., 2000) describes a process for the separation and liquefaction of component gasses from a pressurized mix gas stream. The process involves cooling the pressurized mixed gas stream in a heat exchanger so as to condense one or more of the gas components having the highest condensation point, among other steps. This patent involves a process in which the fluid to be condensed is used as its own refrigerant to produce multiple streams of liquid products. The present invention uses an intermediary chilling fluid to cool the process media by means of an external refrigerant.

U.S. Pat. No. 7,219,512 (Wilding et al., 2007) discloses an apparatus and method for producing liquefied natural gas (LNG) in which a liquefaction plant is coupled to a source of unpurified natural gas, such as a natural gas pipeline at a pressure letdown station. A portion of the gas is drawn off and split into a process stream and a cooling stream. The cooling stream passes through a turbo-expander to create work output, which drives a compressor. The compressor compresses the process stream, which is cooled and divided into first and second portions. The first portion is expanded to liquefy the natural gas. The second portion is expanded and used to cool the compressed process stream. The Wilding invention uses a turbo-expander to effectuate gas cooling, whereas the present invention uses external refrigeration and an intermediate cooling fluid to cool the process stream.

U.S. Pat. No. 7,600,396 (Mak, 2009) uses LNG or components of LNG as working fluids in power generation cycles in an LNG regasification plant. The present invention differs from this patent in that LNG is not used as a working fluid. Furthermore, the present invention is not an LNG regassification plant.

U.S. Pat. No. 8,020,406 (Vandor et al., 2011) provides a method and system for the small-scale production of LNG. The method comprises configuring a prime mover to be in operable communication with a multi-stage compressor, configuring the prime mover to be in fluid communication with an ammonia absorption chiller, configuring the ammonia absorption chiller to be in fluid communication with the multi-stage compressor, operating the ammonia absorption chiller using waste heat from a prime mover, pre-cooling a first stream of natural gas using cooled fluid from the ammonia absorption chiller, cooling a first portion of the first stream of natural gas into a two-phase stream using an expansion valve, cooling a second portion of the first stream to liquefied natural gas using the two-phase stream as a cooling fluid, delivering the second portion of the first stream as LNG to a low-pressure LNG tank, cooling a third portion of the first stream of natural gas in a turbo-expander, separating liquid heavies out of the third portion of the first stream of natural gas, and delivering the liquid heavies to a pressure tank. The Vandor invention uses a turbo-expander to form LNG, whereas the present invention does not perform this process or produce LNG.

U.S. Pat. No. 8,505,333 (Evans et al., 2013) discloses an LNG facility employing an optimized heavies removal system comprising at least one distillation column and at least two separate heat exchangers. The present invention does not use a distillation column, nor does it reintroduce previously separated streams to the process stream, as described in Evans.

In U.S. Pat. No. 9,829,244 (Mak, 2017), a small-scale natural gas liquefaction plant is integrated with an LNG loading facility in which natural gas is liquefied using a multi-sage expansion cycle. The present invention does not produce LNG, nor does it use multi-stage expansion.

U.S. Pat. No. 9,945,608 (Ploeger et al., 2018) provides systems and methods for separating ethane and heavier hydrocarbons from a natural gas stream. In one embodiment, an adsorption unit is integrated with a cryogenic gas processing plant in order to overcome methane recovery limitations. Ploeger uses cryogenic cooling to maximize separation of methane and ethane. The present invention separates natural gas liquids from a methane/ethane mix and does not utilize a cryogenic gas processing plant.

U.S. Pat. No. 10,655,911 (Turner et al., 2020) covers a method of liquefying natural gas in which a gaseous natural gas process stream is cooled with a refrigerant flowing in a path isolated from the natural gas process stream. The refrigerant may differ in composition from the natural gas process stream, and it may also be operated at pressures, temperatures and flow rates that differ from those of the natural gas process stream. The Turner invention involves a process in which a multi-pass heat exchanger is used to cross various streams of liquids and gas produced by the process to produce products. By contrast, the present invention uses a chilling fluid and not a multi-pass heat exchanger for cooling of the process.

U.S. Patent Application Pub. No. 20140366577 (Zubrin et al.) discloses a field-deployable system for separating methane and natural gas liquids (NGLs) from a raw gas stream. The system includes a compressor, a dehydrator, a refrigerator having one or more stages, and a separation subsystem adapted to separate the raw gas stream into three product streams. Rather than using a refrigeration system with one or more stages, the present invention uses a chilling fluid as an intermediary cooling source for process gas. Additionally, the present invention is designed to form two streams, one of lean gas and one of liquids, whereas Zubrin's system produces an ethane-rich stream.

BRIEF SUMMARY OF THE INVENTION

The present invention is a method for treating associated gas comprising: providing a stream of raw gas; passing the stream of raw gas through safety valving; passing the raw gas through an inlet pressure control mechanism to control a flow rate of the raw gas; passing the raw gas through an inlet scrubber; transmitting pressure and temperature data for the raw gas to a control system via a pressure transducer and a temperature transducer that are located on the inlet scrubber; sending the raw gas to a gas compressor to generate pressurized gas; sending the pressurized gas to an aerial cooler that uses ambient air to reduce a temperature of the pressurized gas to a desired setpoint; sending the pressurized gas to a chiller heat exchanger, wherein a chilling media cooled by a refrigeration system to a desired setpoint contacts the pressurized gas through the chiller heat exchanger to further reduce the temperature of the pressurized gas, thereby generating chilled pressurized gas; sending the chilled pressurized gas to a vapor liquid separator to generate processed gas; routing the processed gas either through a system backpressure valve or through a pressure reducing recycle valve that directs the processed gas to the inlet scrubber; and delivering the processed gas that has passed through the system backpressure valve as fuel or routing the processed gas through a backpressure regulating recycle valve that directs the processed gas to a system inlet pressure reducing valve.

In a preferred embodiment, the invention further comprises the step of performing hydrate inhibition or dehydration on the pressurized gas. In another preferred method, the chilling media is regulated and cooled by the refrigeration system; wherein the refrigeration system comprises at least one refrigeration compressor that is regulated by a controller to compress refrigerant, the method further comprising the steps of: sending the refrigerant to a refrigeration condenser; using the refrigeration condenser to cool and condense the refrigerant; routing the refrigerant to an accumulator tank and an expansion valve, thereby generating a reduced temperature refrigerant; and crossing the low temperature refrigerant with the chilling media in an evaporator, thereby transferring accumulated heat from the chilling media to the refrigerant and resulting in vaporization of the refrigerant and generating warmed vapor refrigerant.

In a preferred embodiment, the invention further comprises the steps of: pumping the chilled media in a loop from the evaporator to the chiller heat exchanger, thereby removing heat from the pressurized gas; and routing the warmed vapor refrigerant through the compressor. Preferably, the step of sending the pressurized gas to an aerial cooler that uses ambient air to reduce a temperature of the pressurized gas to a desired setpoint includes using a variable speed fan modulated by the controller to reduce the temperature of the pressurized gas.

In another preferred embodiment, the invention further comprises the step of: sending the pressurized gas to an economizer heat exchanger, wherein the economizer heat exchanger further reduces the temperature of the pressurized gas by crossing it with processed gas. In yet another preferred embodiment, the step of routing the processed gas either through a system backpressure valve or through a pressure reducing recycle valve that directs the processed gas to the inlet scrubber includes routing the processed gas to the economizer heat exchanger, from which the processed gas is directed either through the system backpressure valve or through the pressure reducing recycle valve.

In a preferred embodiment, the invention further comprises the step of: using a combustible gas detection sensor, input from one or more hardware safety interlocks, and/or a remote telemetry service to send shutdown notices to the controller if any number of safety parameters is not met. In another preferred embodiment, the step of performing hydrate inhibition or dehydration on the pressurized gas includes utilizing one of the processes selected from the group consisting of thermally regenerated desiccant dehydration, methanol injection, glycol adsorption, and membranes.

In a preferred embodiment, the invention further comprises the steps of: using the controller to collect data from temperature sensors to determine whether a desired setpoint is being met; and adjusting a temperature of the chilling media by increasing or decreasing heat removal via the at least one refrigeration compressor, the refrigeration condenser, and the expansion valve to achieve the desired setpoint. Preferably, the invention further comprises the steps of: wherein the processed gas has a pressure, using a sensor to read the pressure of the processed gas; using the controller to determine whether the pressure of the processed gas is at a desired setpoint; and if the pressure of the processed gas is not at the desired setpoint, using the controller to adjust the system backpressure valve and/or to output a signal for an operator to adjust a manual valve.

In an alternate embodiment, the invention is a method for treating associated gas comprising: providing a stream of raw gas; passing the stream of raw gas through safety valving; passing the raw gas through an inlet pressure control mechanism to control a flow rate of the raw gas; transmitting pressure and temperature data for the raw gas to a control system via a pressure transducer and a temperature transducer that are located on the inlet scrubber; sending the pressurized gas to a chiller heat exchanger, wherein chilling fluid cooled by a refrigeration system to a desired setpoint contacts the pressurized gas through the chiller heat exchanger to further reduce the temperature of the pressurized gas, thereby generating chilled pressurized gas; sending the chilled pressurized gas to a vapor liquid separator to generate processed gas; routing the processed gas through a system backpressure valve; and delivering the processed gas that has passed through the system backpressure valve as fuel.

The present invention is also a system for treating associated gas comprising: safety valving that is configured to control a stream of raw gas; a pressure reducing regulator that is configured to control a flow rate of the stream of raw gas; a liquids removal inlet scrubber that is configured to remove liquids droplets from the stream of raw gas; a compressor that is configured to compress the stream of raw gas to generate pressurized gas; an oil separator that is configured to remove liquids and vapor droplets from the pressurized gas; an aerial cooler that is configured to use ambient air to reduce a temperature of the pressurized gas to a desired setpoint; a chiller heat exchanger; a refrigeration system comprising a chilling media; a vapor liquid separator; and a backpressure regulating recycle valve; wherein a chilling media cooled by the refrigeration system to a desired setpoint contacts the pressurized gas through the chiller heat exchanger to further reduce the temperature of the pressurized gas, thereby generating chilled pressurized gas; wherein the vapor liquid separator is configured to remove liquids and vapor droplets from the chilled pressurized gas to generate processed gas; wherein the processed gas is routed through the system backpressure valve or through a pressure reducing recycle valve that is configured to direct the processed gas to the inlet scrubber; and wherein after passing through the system backpressure valve, the processed gas is delivered as fuel or routed through a backpressure regulating recycle valve that is configured to direct the processed gas to a system inlet pressure reducing valve.

REFERENCE NUMBERS

Figure 1:
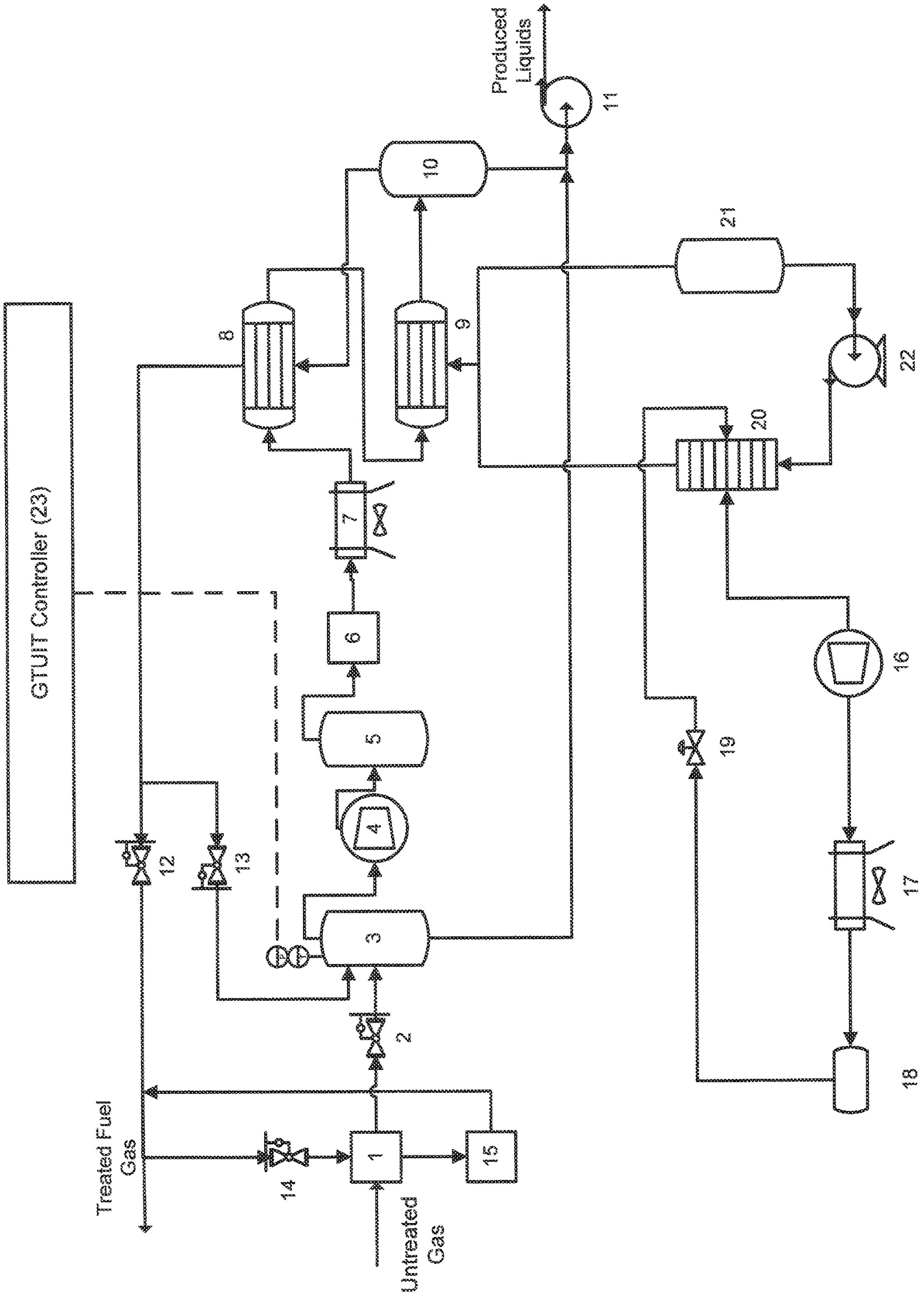
FIG. 1 is a system architecture diagram of a first embodiment of the present invention.

1 Safety valving
2 Pressure reducing regulator
3 Inlet scrubber
4 Gas compressor
Gas/oil separator
6 Methanol injection pump or other dehydration or hydrate suppression equipment
7 Aerial cooler
8 Economizer heat exchanger
9 Chiller heat exchanger
10 Vapor liquid separator
11 Pump (dump) valve
12 Backpressure valve
13 Pressure reducing recycle valve
14 Backpressure regulating recycle valve
15 Manifold
16 Refrigeration compressor
17 Refrigeration condenser
18 Accumulator tank
19 Expansion valve
Evaporator
21 Tank
22 Circulation pump
23 Controller
24 Gas reheater Note: Only the components shown in FIGS. 1 and 2 (the system architecture diagrams) are included in the above reference number list.

DETAILED DESCRIPTION OF INVENTION

A. Overview

Reciprocating engines and turbines have existed for many years and have become increasingly popular in areas of oil and gas exploration and production that had previously been dominated by diesel fired engines or turbines. Recently, engine manufacturers have developed dual fuel engines that can burn a combination of diesel and natural gas, which allows for many of the benefits of both diesel- and gas-fired engines. These engines can substitute a majority of their required diesel with natural gas, provided the gas is of sufficient quality. Additionally, engine manufacturers have developed gas-fired engines that can be used in place of diesel engines.

Turbine manufacturers have also developed gas-fired turbines that can work in combination with specialized electrical equipment to operate in place of diesel equipment. To supply these engines with gas, service providers and producers have relied on gas sources transported from gas processing facilities to the operating site. This gas is typically delivered to site via a treated gas pipeline or trucked to the site in one of two forms, compressed natural gas (CNG) or LNG. Increasingly, many sites have nearby access to pipelines containing large volumes of untreated associated gas or “rich” gas. Unfortunately, this gas cannot be used directly in these engines or turbines without first undergoing a form of treatment.

Gas known as associated gas or rich gas is gas of widely varying composition. These gases have become more abundant with increased production of oil and gas. Associated gas or rich gas tends to have a much higher energy content than typical high methane purity natural gas. The reason associated or rich gas has more energy per standard cubic foot is because it contains longer chain hydrocarbons, also known as heavy hydrocarbons. These components include propane, butanes, pentanes, hexanes and other longer chain hydrocarbons. All of these components contribute to the “richness” of the gas and increase the energy content.

To process associated or rich gas to make it useable in turbines, dual fuel, or natural gas engines, the gas stream must be conditioned to remove unwanted longer chain hydrocarbons, in some cases using compression and cooling to condense these hydrocarbons. In general, the hydrocarbons to condense out first are the components with the lowest vapor pressure. Vapor pressure is the pressure at which a compound’s liquid state is in equilibrium with its vapor state for a certain temperature. In other words, there are as many molecules evaporating as there are condensing. If the system pressure is more than the vapor pressure, more liquid will form. If the system pressure is less than the vapor pressure, then more vapors will form.

Vapor pressure is also a function of temperature. As the temperature decreases, so does the vapor pressure. In order to condense out compounds in associated or rich gas, the gas pressure can be increased above the vapor pressure, the gas can be cooled, or both can occur concurrently. The present invention does both and has the ability to adjust system pressure and temperature to treat an associated or rich gas to a desired specification.

In addition to the need for condensing hydrocarbons out of an associated or rich gas, there are other parameters that are necessary to meet in order to run engines effectively. For example, oil wells are hydraulically fractured using large pumps coupled to reciprocating engines capable of utilizing gas as well as electric motors powered by gas-consuming turbines or engines. The fracture operation occurs in many stages, a series of pumping events, and at the beginning of each stage torque to the pump shaft must rapidly increase. To avoid damaging a natural gas capable engine or turbine, and to minimize the need for fuels other than gas such as diesel, the treated gas must instantaneously be available in sufficient quantity and be of sufficient quality.

To supply sufficient flow and adequately processed/treated gas, in a preferred embodiment, the present invention employs a variable frequency drive (VFD)-controlled gas compressor in conjunction with a chiller-based refrigeration system to compress and cool the gas and remove heavy hydrocarbons by converting them to a liquid state. These liquids are commonly referred to as NGLs.

In instances where fuel gas is not required for a period of time, the present invention is configured to turn off the gas compressor or send the gas through a recycle loop. In order to have instantaneous treated gas of a quality necessary for proper engine or turbine operation, the present invention is configured to maintain the chiller at its required temperature through the use of chilling media and gas recycle.

A chiller is not a typical direct refrigeration system in which the refrigerant is expanded directly into a gas-to-gas heat exchanger. Instead, a chiller uses refrigeration to cool an intermediary heat transfer fluid, and the cold fluid is then pumped to a chiller heat exchanger to cool the gas to the desired temperature. Because the refrigeration system of the chiller monitors the temperature of a reservoir of heat transfer fluid and supplies cooling based on the fluid temperature, the system components can be selected (sized) to optimize the volume, heat capacity, and desired temperature of the fluid to provide several minutes of gas cooling capacity during rapid changes in gas flow. The present invention precools and maintains a reservoir of cold intermediary chilling fluid so that the gas can be cooled instantaneously when called upon. This thermal reservoir to ensure instantaneous cooling and precise processed gas quality is an improvement over prior art.

Because the chilling fluid absorbs spikes in cooling demand, the refrigeration system has time to increase and decrease its cooling load. When the demand for gas arises and more gas is flowing through the chiller heat exchanger, associated or rich gas can be cooled to the desired temperature immediately. This is not possible with a direct refrigeration system because the refrigerant is not flowing during low or no demand scenarios, causing increased temperatures and spikes in refrigerant pressures during rapid load changes, which may shut down the direct refrigeration equipment. With the present invention, when there is no gas fuel demand; the chiller refrigeration loop runs until the tank of cooling fluid reaches the desired set point and then cycles on and off to maintain temperature until there is demand.

Within the present invention, raw gas is first routed through a fail-closed valve, which is used as a safety to ensure gas only enters the process when proper start-up and resulting operating conditions are met. From here, the raw gas passes through a pressure reducing regulator, which sets the inlet pressure for the gas compressor. The pressure-reduced raw gas then passes through an inlet scrubber that removes any liquids droplets before then entering the compressor. The compressor raises the pressure of the gas to the desired setpoint for the process, producing pressurized gas. If an oil flooded screw is used as a compressor, the oil and gas mixture is then separated before the pressurized gas is directed to the next step in the process.

Hydrate inhibition or dehydration are next performed on the pressurized gas if the setpoints of the system are such that water removal or hydrate inhibition is required. Water is often entrained in the natural gas stream and may be required to be removed to prevent freezing during the chilling process.

The pressurized gas is next routed through an aerial cooler, where the gas is either cooled to a value approaching ambient temperature or to a setpoint controlled by the system controller. From here, the pressurized gas enters the economizer, where it is crossed with cold processed gas exiting the separator. This is done to maximize process cooling while reducing required refrigeration. The pressurized gas then enters the chiller heat exchanger, where the gas is cooled by an intermediary cooling fluid (chilling media). This cooling fluid removes heat and can absorb fluctuations in gas chemistry and inlet temperature. This cooling process produces a phase change in the gas, resulting in a mixture of gas and liquids requiring separation. From here, the mixture enters a separator, which removes the liquids and vapor droplets from the natural gas, creating processed gas. Liquids are then removed and directed to storage using either pressure or a pump.

The dry natural (processed) gas is next routed through the other side of the economizer to cool the inlet (pressurized) gas and then through a backpressure valve, which maintains the overall system pressure. If there is too little gas available for the inlet of the gas compressor, a stream of gas can be directed from here (the line downstream of the backpressure valve) back to the suction scrubber using a pressure reducing valve. If there is more gas being processed than required for fueling, a separate backpressure regulating recycle valve will allow conditioned gas to loop back to the front of the system. All remaining conditioned gas is now ready to be piped to the engines to be fueled.

Prior to the present invention, others have tried different technologies-such as the Joule Thomson effect (JT skids), direct refrigeration, and membranes—to solve the same problem as the present invention. JT and direct refrigeration have not been successful because they are not able to handle varying load demands in an instantaneous or consistent manner. Membranes have proven to be physically fragile while in contact with heavier hydrocarbons from associated gas or rich gas of varying gas compositions. The integrity of membranes can degrade rapidly in these applications and have generally prove to be unreliable while requiring large amounts of recycle compression to reach comparable treated gas specifications.

Advantages of the present invention over prior art include the fact that the present invention is specifically designed for the treatment of associated gas or rich gas to achieve the desired gas composition to burn in gas-powered engines or turbines. The present invention uses a thermal reservoir specifically designed to provide instantaneous cooling of associated or rich gas to achieve the necessary processing of that gas to run in a gas-fired engine. There is no transition period or lag in processing from raw associated or rich gas to treated fuel quality gas, whereas prior art either does not provide sufficient temperature control (as with JT skids) or requires a significant amount of gas to be processed before the desired gas composition is achieved. The entire treatment skid of the present invention can be mounted on a trailer, allowing it to move easily between sites.

B. Detailed Description of the Figures

Figure 2:
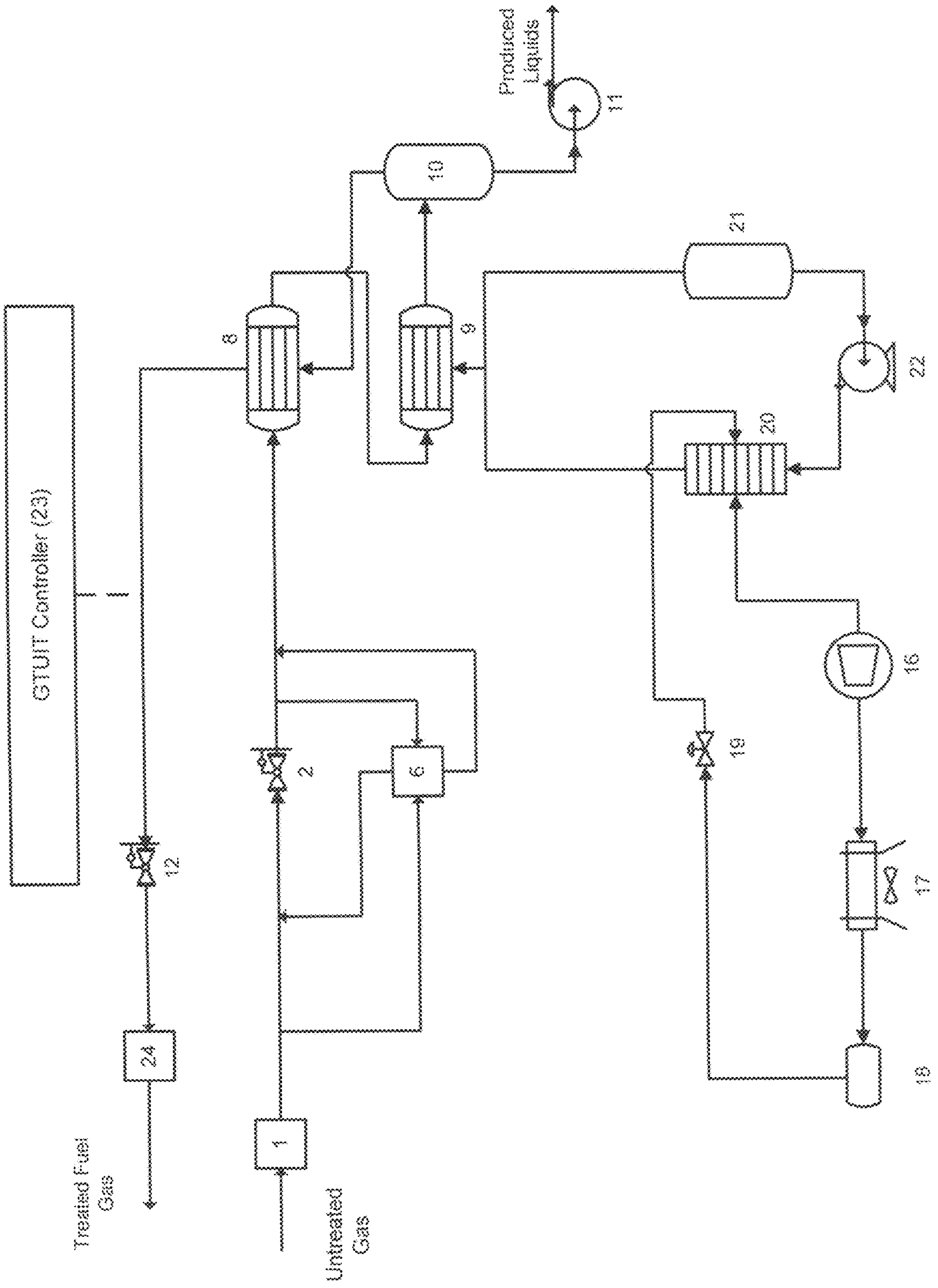
FIG. 2 is a system architecture diagram of a second embodiment of the present invention.

FIGS. 1 and 2 are system architecture diagrams of first and second embodiments, respectively, of the present invention. In a first embodiment, the system is comprised of safety valving, a pressure reducing regulator, a liquids removal inlet scrubber, a compressor, an oil separator, an aerial cooler, a chiller heat exchanger (optionally in combination with an economizer heat exchanger), a refrigeration system with an intermediary chilling fluid (chilling media), a separator, and a backpressure regulating recycle valve. In a second embodiment, the system is comprised of the same equipment as listed above with the exception of the inlet scrubber, compressor, oil separator, aerial cooler, pressure reducing regulator, and backpressure regulating recycle valve, all of which may be bypassed or removed.

Referring to the method of the present invention, which utilizes the equipment identified above and in FIGS. 1 and 2, the first step of the process is for raw/rich gas to pass through the safety valving 1 (see FIG. 1). Here a fail-closed valve is opened to allow gas to pass through to the entirety of the system when the equipment is powered on and all of the site safeties are in their operational range. When the system is off or a safety shutdown is initiated, this valve is closed to prevent additional gas from entering the rest of the equipment.

The raw gas then passes through a system inlet pressure reducing valve 2. This regulator ensures that the gas is at the proper starting pressure for further treatment. Inlet pressure control is also used to control flow rate through the remainder of the equipment. The raw gas then passes through the inlet scrubber 3. In the inlet scrubber, any liquids droplets or particulate are removed, providing a droplet-free vapor at the present pressure and temperature of the gas. A pressure transducer and a temperature transducer are located on this scrubber vessel and transmit data to the control system so that the values can be compared against a list of safety shutdown parameters.

From the scrubber, the raw gas enters a gas compressor 4. The compressor can be one of many types, including oil flooded screw, reciprocating, liquid ring, dry screw, centrifugal and other forms of compressors. The compressor is driven by either a variable speed reciprocating engine, which is an electric motor that is connected to a VFD that can be programmed to vary the compressor's rotational speed, or any other controlled power device. Variation in rotational speed is used in conjunction with the inlet pressure reduction to vary gas flow rate through the compressor. If an oil flooded screw is used, the gas and oil mixture then flows to a gas/oil separator 5. Here the oil for compression is filtered off and directed back to the compressor while the pressurized gas is directed through piping to the next piece of equipment.

Hydrate inhibition or dehydration 6 is next performed as deemed necessary according to the equipment's operating temperature and pressure. If the operating temperature and pressure indicate possible hydrate formation, methanol or another inhibitor can be injected at this point, or the gas can be directed through a dehumidifier such as a thermal swing or pressure swing desiccant, glycol dehydration unit, membranes, or other water removal method.

Pressurized gas next enters an aerial cooler 7. The aerial cooler uses ambient air and a variable speed fan modulated by the controller to reduce the gas temperature to a setpoint or as close to ambient temperature as possible.

Pressurized gas next enters the economizer heat exchanger 8. This economizer heat exchanger further reduces the temperature of the pressurized gas by crossing it with chilled processed gas from the chiller heat exchanger 9. The pressurized gas then passes from the economizer heat exchanger 8 to the chiller heat exchanger 9. Here chilling fluid (also referred to herein as "chilling media") cooled by the refrigeration system to the operator-selected temperature setpoint contacts the gas through a heat exchanger and reduces the temperature of the pressurized gas. This reduction in temperature, in combination with the increase in pressure from the compressor, results in liquid formation as the gas enters its two-phase state.

From here, the chilled pressurized gas enters a vapor liquid separator 10, creating processed gas. The liquids are routed from the separator to liquid storage using either a pump 11 or the pressure from the system, and the gas is routed back to the economizer heat exchanger. From here, the processed gas will pass through the other side of the economizer 8 and then can either pass through the system backpressure valve 12 that maintains the pressure through the system or through a pressure reducing recycle valve 13 that will redirect the processed gas back to the inlet scrubber in the event that there is too little inlet gas and it is desired to keep the compressor running. Gas that has passed through the system backpressure valve can now be delivered as fuel or routed through a backpressure regulating recycle valve 14 that will direct the processed gas back to the system inlet pressure reducing valve 2 in the event that there is low engine fuel demand. More than one iteration of the system of the present invention may be operated in parallel 15, in which case their processed gas lines are manifolded together, thereby allowing gas to recycle to all the units evenly.

The chilling media used in the chiller heat exchanger is regulated and cooled by the refrigeration system. The refrigeration system uses at least one refrigeration compressor 16 regulated by the controller to compress refrigerant, which is then sent to the refrigeration condenser 17. The refrigeration condenser uses fans that blow air across fins containing the refrigerant to cool and condense the hot refrigerant, resulting in reduced pressure. The refrigerant is then routed to an accumulator tank 18 followed by an expansion valve 19, which results in a reduced temperature refrigerant. The low temperature refrigerant is then crossed with the chilling media in the evaporator 20, transferring the accumulated heat from the chilling media to the refrigerant and resulting in vaporization of the refrigerant.

This chilled media is then collected in a tank 21 and pumped by a circulation pump 22 in a loop from the evaporator to the chiller heat exchanger 9, where the heat is removed from the pressurized gas. This reservoir of continually cooled heat exchange media is what allows the system to respond instantly to changes in gas flow, temperature, and composition, providing more consistent fuel quality over previous art. The warmed vapor refrigerant is routed through the compressor again, completing the loop. If reduced refrigeration capacity is called for by the controller 23, the refrigeration capacity can be reduced by slowing the speed of the compressors, routing compressed refrigerant back to the suction side of the compressor through the use of hot gas bypass, turning off individual refrigeration compressors, or other refrigeration control methods. The controller monitors and maintains the steady operation of the equipment and can be either a programmable logic controller (PLC), a programmable automation controller (PAC), or any other control technology available.

In an alternative embodiment of the present invention (FIG. 2), supplied raw gas is at a pressure such that the use of a compressor is not necessary. In this instance, the inlet scrubber 3, compressor 4, oil separator 5, aerial cooler 7, pressure reducing recycle valve 13, and backpressure regulating recycle valve 14 may be bypassed or removed. The flow of gas instead would proceed through the previously described safety valving to the pressure reducing valve 2 and then to the economizer heat exchanger 8. Hydrate inhibition or dehydration 6 may occur before, after, or both before and after pressure reduction, depending on the type of hydrate inhibition or dehydration used, if any is required. The gas then enters the chiller heat exchanger 9 before proceeding to the separator. Upon exiting the separator 10 and reheating side of the economizer 8, the gas is able to flow through the system backpressure valve 12 and to the fuel line or through an optional gas reheater 24. As in the first embodiment, liquids will be removed from the system using either system pressure or a pump 11. Depending on the gas flow rate, multiple systems or system components may be run in parallel in order to alter the total fueling capacity while keeping each component within its design flow characteristics. Steps 16 through 22 will occur as previously described in the first embodiment.

Figure 3:
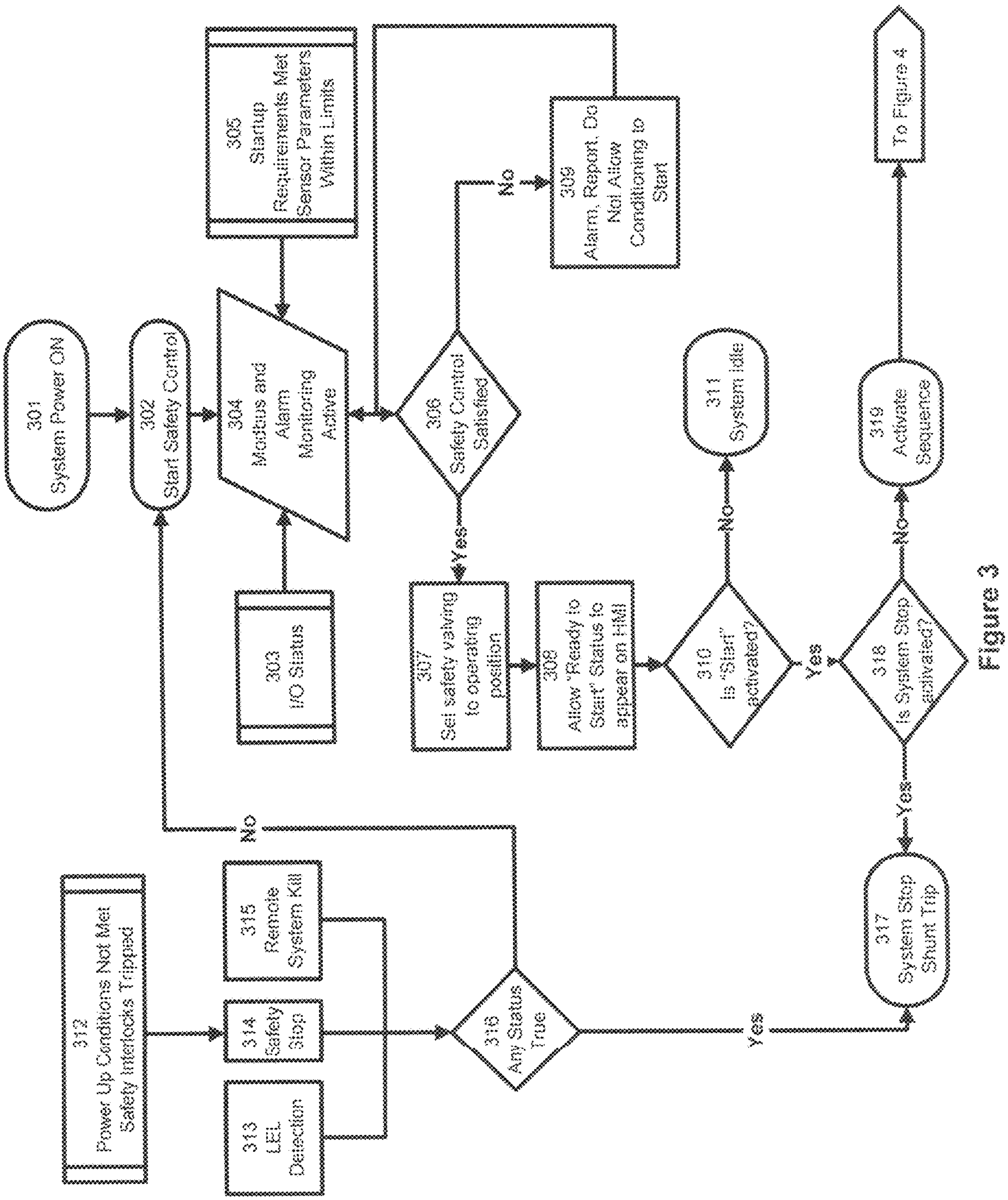
FIG. 3 is a flow diagram of the safety logic employed as part of the present invention in determining whether the system is ready to begin pulling raw gas from a source.

FIGS. 3 through 7 are flow diagrams of the programming sequence of the present invention. As shown in FIG. 3, when initial power is applied, the controller begins the Boot-Up process 301. The controller then initializes the monitor for correct configuration and begins checking safety stop interlocks, combustible gas detection, and remote modbus values. If all initial values are within allowed parameters, the controller allows system startup 302. Both analog and digital inputs and outputs used for control and operational decisions are used by the controller. Discrete switch positions, analog temperatures, valve positions, and pressures are monitored by the controller 303. The controller continually monitors conditions to ensure ongoing safe operation 304. At step 305, the controller assesses whether start-up requirements have been met based on both operator input (for example, as to system configuration and parameters for high and low limits) and sensor parameters (for example, regarding the state of the system).

If all preceding safety criteria are satisfied, the system transitions from startup to processing 306. As long as the safety control 306 is satisfied, the safety valve 307 will set to its operating position, and the "Ready to Start" icon will appear on the human-machine interface (HMI), 308. The system can stay in this mode indefinitely until the start icon is toggled. If at any time the safety status is no longer satisfied, the "Ready to Start" icon disappears, and the alternate path 309 is invoked until the issues are cleared 307. In the event that the safety control is no longer satisfied, alarms are generated, and a report is cued for send out to the remote monitoring network. An inhibit is also fed back into the process to prevent startup or continued operation 309, and at that point, the controller monitors the status of the "Ready to Start" bit 310.

If the system is ready to run (i.e., the "Ready to Start" icon appears), but the "Ready to Start" icon has not been pressed, the process will remain in "idle" mode indefinitely 311. Hardware safety interlocks must be satisfied to allow power to be applied to the system. This includes level switches, emergency stop push button switches, and lock out/tag out switches 312. A combustible gas detection (CGD) sensor is located in the same physical electrical enclosure as the controller; this enclosure is separate and apart from the system described above. The CGD sensor monitors for a threshold of 20% or greater of the lower explosive limit (LEL) to send a shutdown notice 313. Any of the safety interlocks from box 311 that fail will send a shutdown notice 314 to the controller, which then initiates the shutdown process. The remote telemetry service (i.e., satellite connection) is also capable of sending a shutdown notice 315 to the controller.

If one of these inputs 313, 314, 315 shows a fault in startup 316, the controller sends a signal to shunt trip the main breaker to shut down the system 317. These three inputs are monitored by the controller whenever the system is in operation. The controller also monitors the system stop button 318. At any time, if the system stop 318 is pressed after a start command has been initiated, the controller sends a signal to shunt trip the main breaker to shut down the system. If the start command has been initiated 310, and there are no faults in startup, the sequence to transition from startup to raw gas conditioning 319 is activated.

Figure 4:
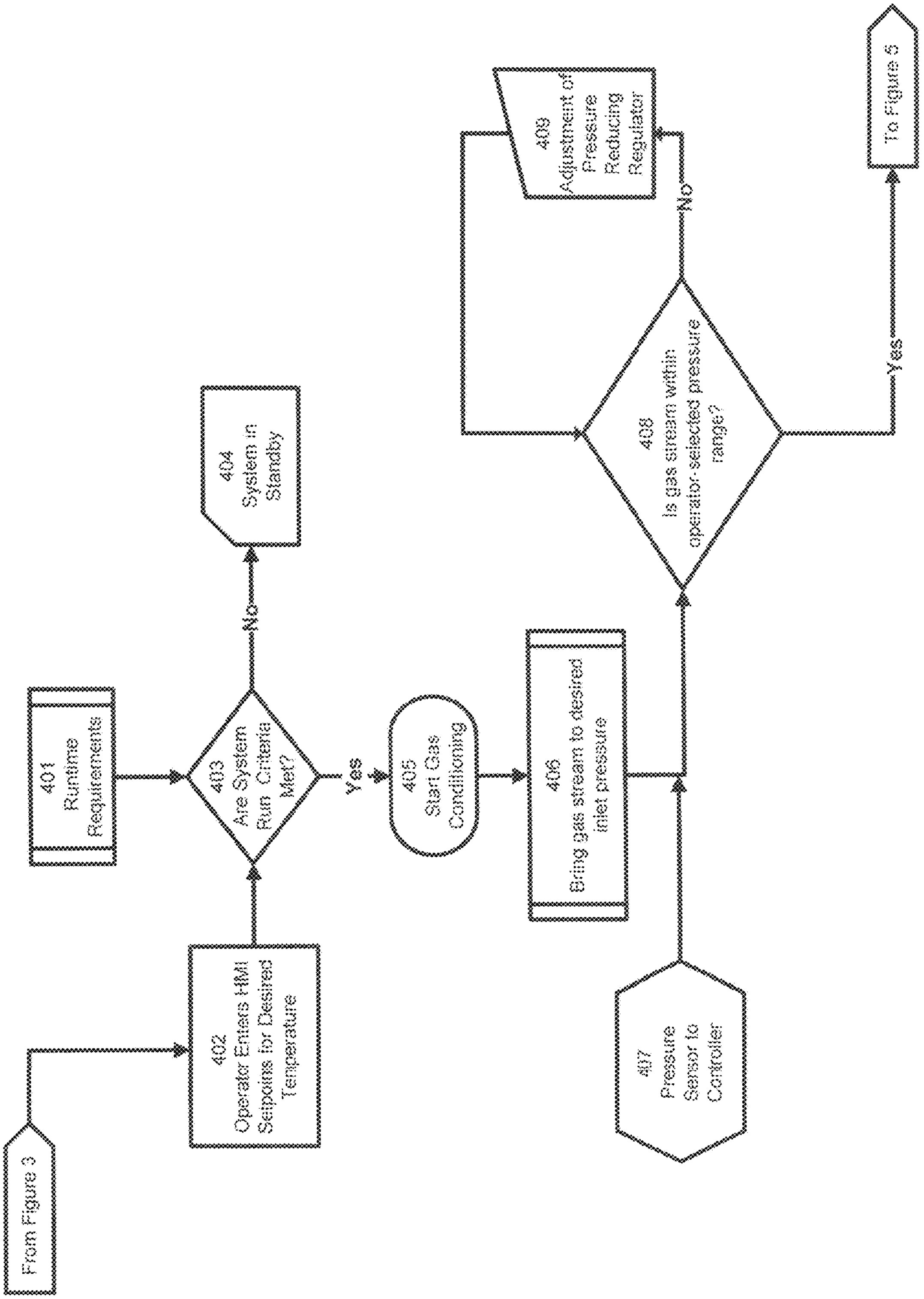
FIG. 4 is a flow diagram of the steps entailed in pressure reduction and scrubbing to prepare the raw gas for processing.

As shown in FIG. 4, there are additional criteria that must be met beyond the startup requirements in order for the system to proceed past the "idle" or "standby" state. These criteria include reservoir oil, chilling fluid temperature, liquid levels, or deltas between ambient and media (gas stream) values 401. These values may not necessitate a system shutdown, but they may require suspension of system operation until the values are within an acceptable range. On the HMI, the operator will input the required parameters and setpoints, 402, specific to the wellsite, including, but not limited to, temperature of the chilling fluid.

As noted in the preceding paragraph, a preconfigured list of runtime requirements must be met before starting the raw gas conditioning 403. The system can stay in standby mode waiting for values to come into compliance with requirements 404. When all requirements—both startup (see FIG. 3) and runtime 401—are met, the controller will activate the compressor and inlet pressure reduction 405 to bring the gas stream to a predictable pressure by throttling through a pressure reducing valve 406. A sensor reads the gas inlet pressure and transmits that data to the controller to ensure that raw gas reaches the setpoint pressure 407. If the raw gas is already below the pre-selected pressure, the pressure reducing valve is left open. If needed, the controller will either adjust the pressure reducing valve or signal the operator to adjust the valve 409.

Figure 5:
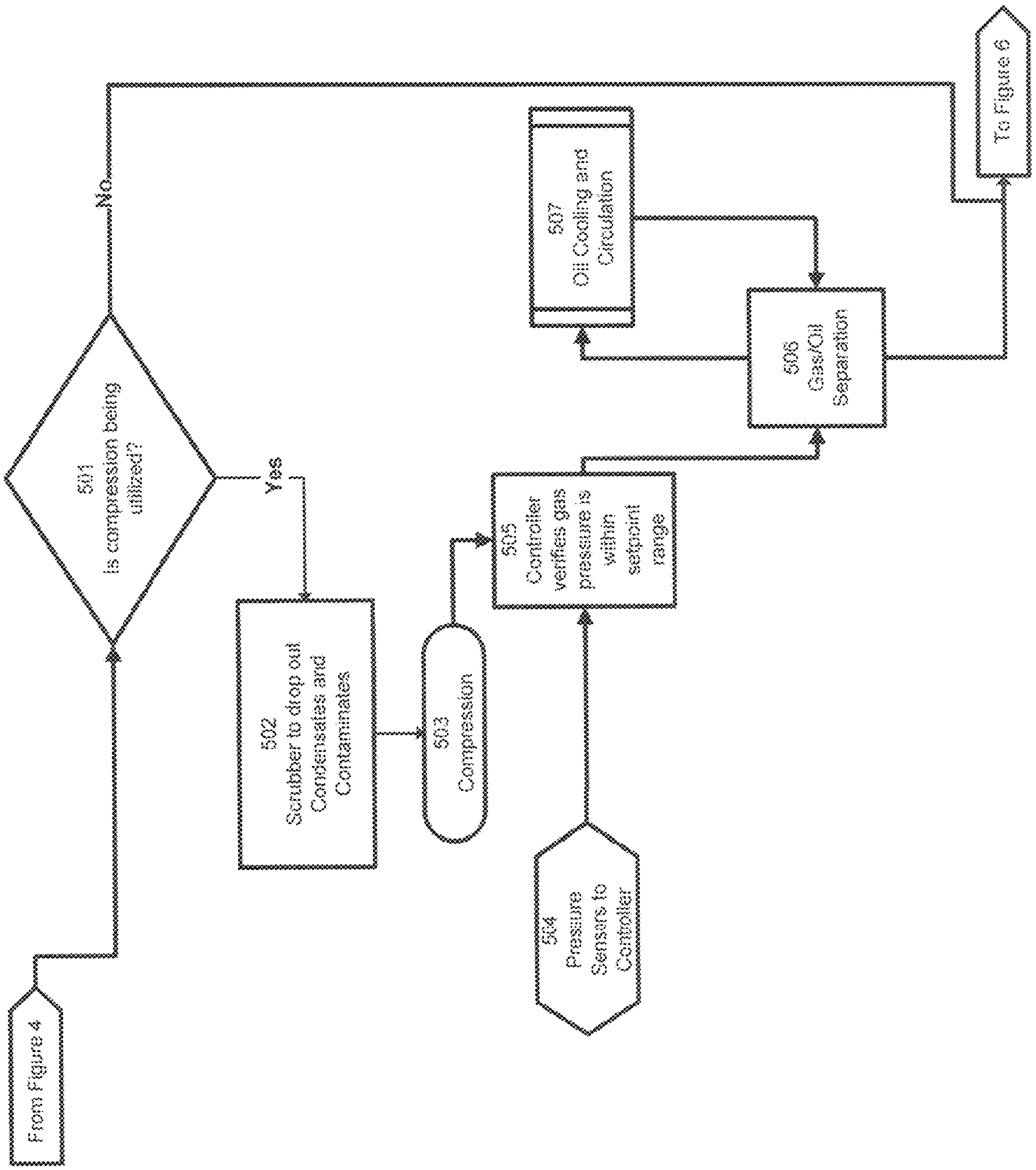
FIG. 5 is a flow diagram of the steps entailed in compressing the raw gas to generate pressurized gas and separating the compressor oil from the pressurized gas.

As shown in FIG. 5, if compression is being utilized 501, gas enters the scrubber to remove condensates and contaminates from the gas stream 502. Compression of the gas may be effectuated by using any type of compressor (e.g., screw compressors, reciprocating compressors, centrifugal compressors, etc.) 503. Pressure sensors 504 are used by the controller to verify that the gas is compressed to within the setpoint range set by the operator 505. From here, if the raw gas is compressed by an oil flooded screw to become pressurized gas, the pressurized gas undergoes separation from compressor oil 506 with the oil stream being returned to cooling and circulation through the compressor 507.

Figure 6:
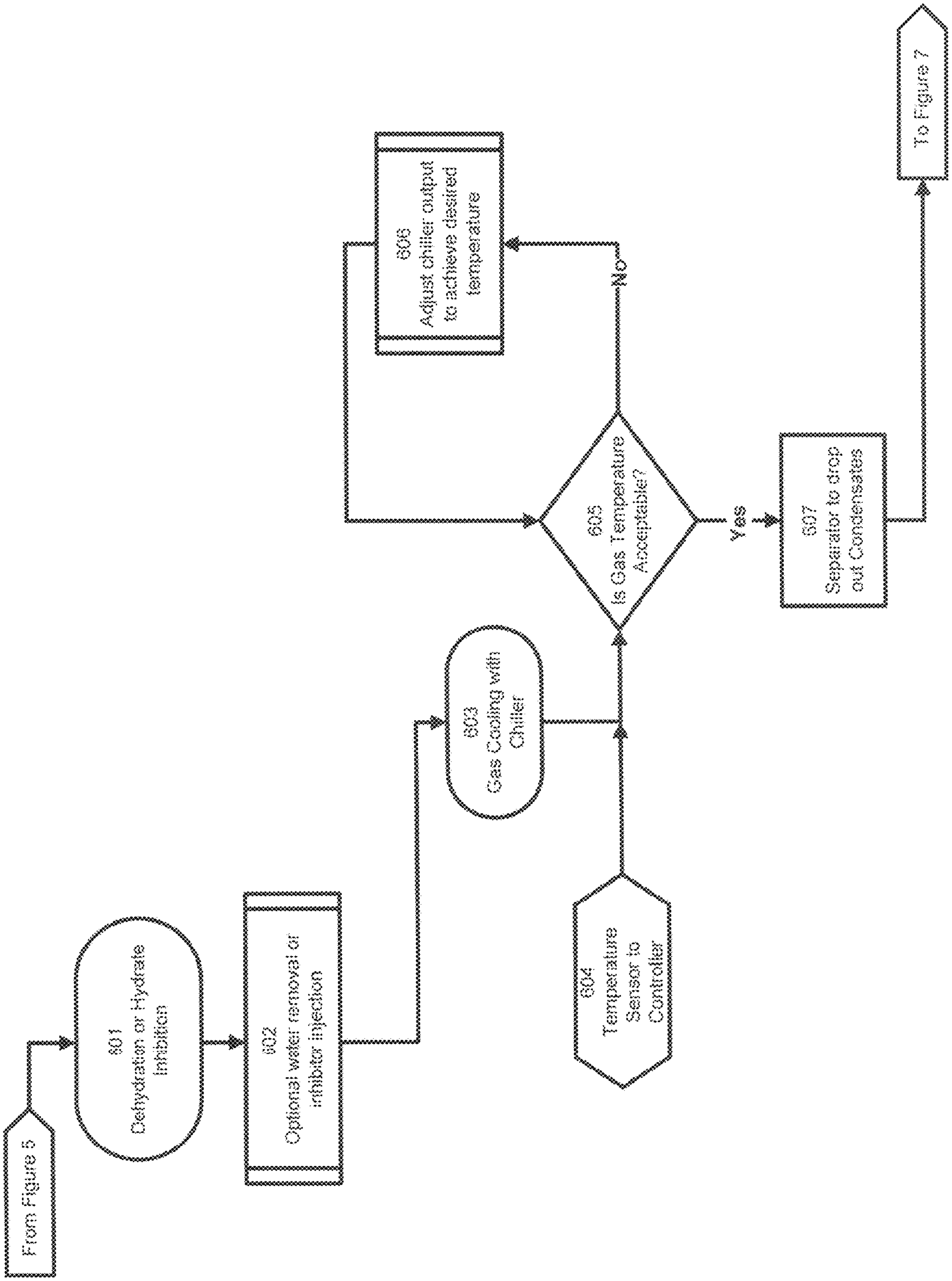
FIG. 6 is a flow diagram of the optional step of dehydrating the pressurized gas and the step of cooling the pressurized gas to generate processed gas.

As shown in FIG. 6, dehydration or hydrate inhibition can be used to prevent the formation of ice or hydrates in the gas stream, should process conditions require it 601. Water removal or hydrate inhibition can be effectuated by any number of processes, including, but not limited to, thermally regenerated desiccant dehydration, methanol injection, glycol adsorption, membranes, or other methods 602. From here, the gas enters the chiller heat exchanger 603, where the gas is cooled to the operator setpoint. The controller collects data from temperature sensors 604 and determines whether the desired setpoint is being met 605. If further adjustment of cooling is required, the controller will adjust the chiller output 606 to achieve the desired gas temperature. As used herein, "chiller output" refers to the refrigeration altering the temperature of the chilling media by increasing or decreasing its heat removal via the refrigeration compressor, condenser, and expansion valve 16,17,19. From here, gas that has now formed liquids is sent to a separator to remove condensates 607.

Figure 7:
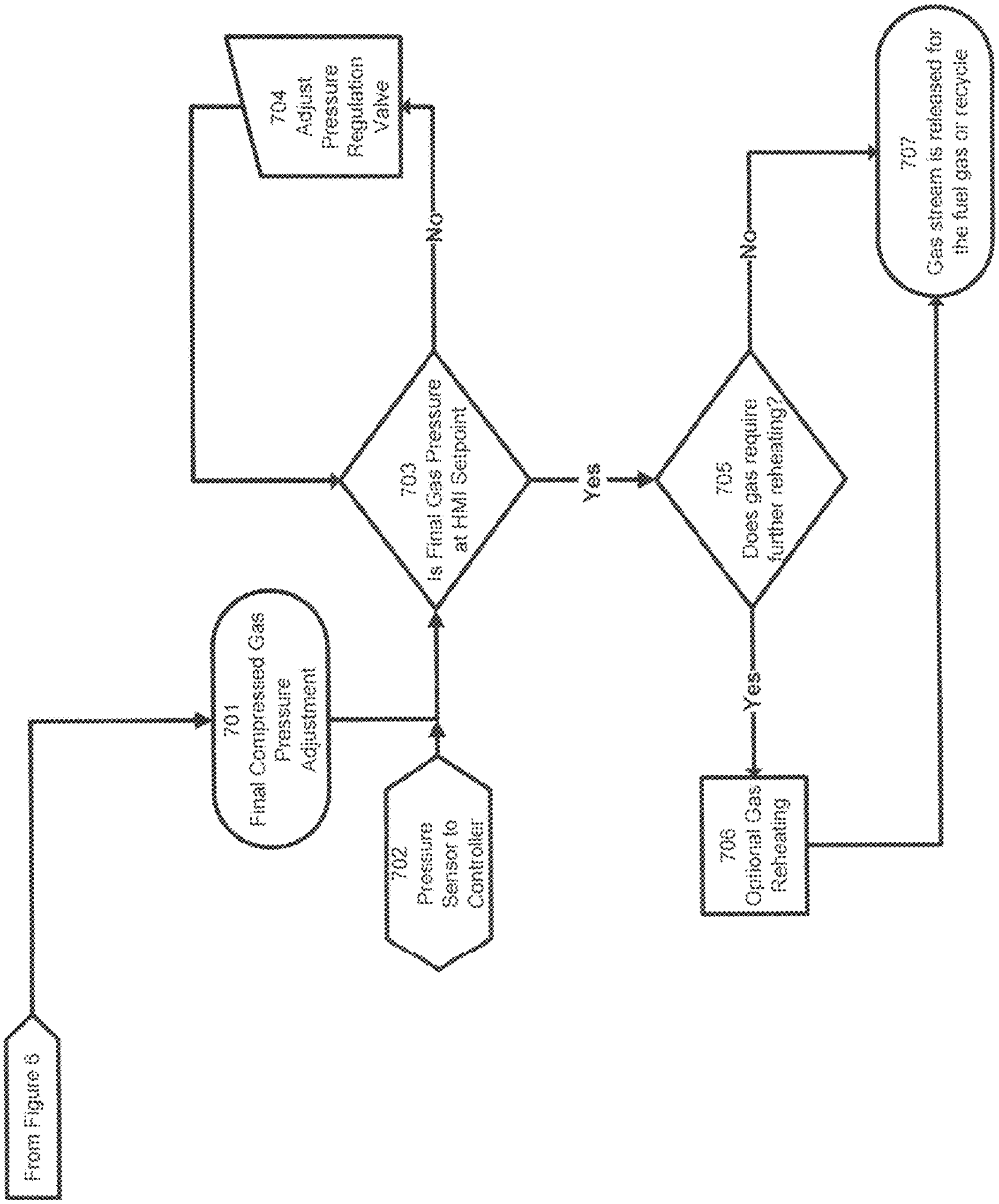
FIG. 7 is a flow diagram of the final processed gas pressure adjustment.

As shown in FIG. 7, final processed gas pressure adjustment is performed by the system backpressure valve 701 (see also reference number 12 on FIGS. 1 and 2). The pressure of the gas is read by sensors 702, and the controller determines whether the gas is at the input setpoint 703. If the gas is not at its setpoint pressure, the controller adjusts the system backpressure valve 12 or outputs a signal for the operator to adjust a manual valve 704. If the gas requires further reheating 705, the gas can be sent to an optional reheater exchanger or heater 706. From here, gas is released for fuel gas or can be internally recycled 707.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for treating associated gas comprising:

(a) safety valving that is configured to control a stream of raw gas;

(b) an inlet pressure control valve that is configured to control a flow rate of the stream of the raw gas;

c) an inlet scrubber that is configured to remove liquid droplets from the stream of the raw gas to generate scrubbed gas;

(d) a pressure transducer and a temperature transducer that are located on the inlet scrubber and configured to transmit pressure and temperature data for the raw gas to a control system;

(e) a gas compressor that is configured to compress the scrubbed gas to generate pressurized gas;

(f) an aerial cooler that is configured to use ambient air to reduce a temperature of the pressurized gas to a first desired temperature setpoint;

(g) a refrigeration system that is configured to cool a chilling media to a second desired setpoint;

(h) a chiller heat exchanger that is configured to reduce the temperature of the pressurized gas by heat exchange between the pressurized gas and the chilling media, thereby generating chilled pressurized gas;

(i) a vapor liquid separator that is configured to remove liquids from the chilled pressurized gas, thereby generating processed gas; and (j) a system backpressure valve that is configured to deliver the processed gas as fuel.

2. The system of claim 1, further comprising:

(k) a pressure reducing recycle valve that is configured to direct the processed gas to the inlet scrubber.

3. The system of claim 1, further comprising:

(k) a backpressure regulating recycle valve that is configured to direct the processed gas to the inlet pressure control valve.

4. The system of claim 2, further comprising:

(j) a backpressure regulating recycle valve that is configured to direct the processed gas to the inlet pressure control valve.

* * * * *